(12) United States Patent
Dunson

(10) Patent No.: US 9,596,841 B2
(45) Date of Patent: Mar. 21, 2017

(54) SMALL GAME CARRIAGE

(71) Applicant: Alford Lynn Dunson, Roxie, MS (US)

(72) Inventor: Alford Lynn Dunson, Roxie, MS (US)

(73) Assignee: Timothy Day, Natchez, MS (US)

( * ) Notice: Subject to any disclaimer, the term of this patent is extended or adjusted under 35 U.S.C. 154(b) by 0 days.

(21) Appl. No.: 13/859,125

(22) Filed: Apr. 9, 2013

(65) Prior Publication Data
US 2013/0284776 A1    Oct. 31, 2013

Related U.S. Application Data

(63) Continuation of application No. 12/941,828, filed on Nov. 8, 2010, now abandoned.

(51) Int. Cl.
*A01M 31/00*      (2006.01)
*A45F 5/02*      (2006.01)

(52) U.S. Cl.
CPC .......... *A01M 31/006* (2013.01); *A45F 5/021* (2013.01); *A45F 2200/05* (2013.01); *A45F 2200/0566* (2013.01)

(58) Field of Classification Search
CPC ... A01M 31/006; A45F 5/021; A45F 2200/05; A45F 2200/0566
USPC ........................................................ 224/251
See application file for complete search history.

(56) References Cited

U.S. PATENT DOCUMENTS

| | | | | |
|---|---|---|---|---|
| 2,458,675 A | * | 1/1949 | Boehm | 224/242 |
| 2,628,749 A | * | 2/1953 | Ryden | 224/223 |
| 2,781,958 A | * | 2/1957 | Lewandowski | 224/246 |
| 4,299,345 A | * | 11/1981 | Lanzl | A63B 47/001 |
| | | | | 221/309 |
| 6,029,872 A | * | 2/2000 | Ellington | 224/251 |
| D605,851 S | * | 12/2009 | Drake | D3/221 |
| D647,164 S | * | 10/2011 | Nook | D22/199 |
| D647,255 S | * | 10/2011 | Enervold et al. | D30/199 |
| 2012/0175389 A1 | * | 7/2012 | Nook | 224/103 |

OTHER PUBLICATIONS

Carson Optical-Pholster, Jun. 9, 2010, http://www.youtube.com/watch?v=99Umt6ecJyY , Jun. 9, 2010.*

* cited by examiner

*Primary Examiner* — Corey Skurdal
(74) *Attorney, Agent, or Firm* — John B. Edel; Edel Patents LLC

(57) ABSTRACT

The small game carriage includes an elongated tube having an inner diameter at least the size of the head of small game to be carried. An elongated slot, running parallel to the longitude of the tube, is formed through the wall of the tube. The width of the slot is wide enough to accommodate the neck of small game to be carried, but is too small for the head of the taken game to pass radially through the slot. The slot has a terminus near the end of the tube to stop small game from sliding out the bottom of the small game carrier and prevent spreading of the slot near the bottom of the tube. A reinforcing ring may be used near the top of the tube to reduce spreading of the slot near the top of the tube. Means, preferably in the form of a belt clip, is provided to removably attach the small game carrier to the clothing of the user, thereby providing for hands free carriage of a number of small animals with head disposed in the tube, neck disposed in slot and body disposed extending outside of tube and projecting away from wearer's body.

15 Claims, 3 Drawing Sheets

SMALL GAME CARRIAGE

CROSS REFERENCE TO RELATED APPLICATIONS

This application is a continuing patent application emanating from presently pending U.S. patent application Ser. No. 12/941,828 filed Nov. 8, 2010.

1. FIELD OF THE INVENTION

The invention herein set forth relates generally the field of hunting, more specifically the hunting of small, necked animals ("game"), such as squirrels, small birds and the like, which are killed for sport, food, fur or other purpose. More particularly the invention herein disclosed and claimed relates to an apparatus to facilitate hands-free carriage of a plurality of small animals which have been harvested, for sport, food, fur or other purpose, on the body of a hunter or other person.

2. GENERAL BACKGROUND

Over the course of time various apparatus have been devised to facilitate "hands-free" carriage of a number of small game animals harvested by a hunter, either on the body of the hunter or another person charged with the task of carrying the harvested game. Such devices take various forms.

One is the form of a vest, worn by the hunter, that has one or more pockets, usually located at the rear of the vest, for carrying small game taken (killed) by the hunter. While this type of vest is comfortable to wear, often has pockets for carriage of other things, such as ammunition, there are certain disadvantages to carrying taken game in this type of vest. Namely blood and other fluids leaking from shot, trapped or killed game tends to leak into the vest, sometimes onto other clothing of the hunter, and if game the hunter thinks was killed, but was merely stunned, should revive, the game may bite the back of the hunter, or may bite the hand of the hunter or another person when he or she reaches in the vest to remove the taken game or to put other animal in the vest.

Various other types of small game carriers have been proposed to carry taken game external of the hunter's, or some other person's, clothing. Some of these other small game carriers are seen in U.S. Pat. No. 2,320,067 to Caughren, U.S. Pat. No. 2,394,805 to Reishus, U.S. Pat. No. 2,458,675 to Boehm, U.S. Pat. No. 3,096,010 to Rasmussen and US Pat. No. Des. 267,519 to Erickson. In general each of these designs has two common disadvantages. The first disadvantage arises from the fact that the head of the harvested animals are not enclosed and are adjacent to the hunter's body during carriage, thereby presenting a risk that a hunter may be bitten by an animal that is merely wounded and/or stunned animal and revives during carriage. The second disadvantage relates to the fact that both the heads and bodies of the harvested animals are adjacent the hunter's body while being carried, increasing the prospect of and/or the amount blood and other fluids from the harvested animals leaking onto the hunter's clothing during carriage of the harvested animals.

The invention herein disclosed and claimed is directed to address to address some of the disadvantages of small game carriers of earlier designs.

3. OBJECTS OF THE INVENTION

The general object of the invention is to provide hunters with an improved apparatus/device for "hands-free" carriage of a plurality of small animals ("game") harvested ("killed") on the body of a hunter or other person.

An additional object of the invention is to provide a small game carrier that is light, durable, easy to carry, simple to use, easy to clean and maintain.

Another object of the invention herein disclosed and claimed is to provide a small game carrier in which the head of taken game is restrained in an enclosure during, thereby reduces the risk of a hunter being bitten by small game that is only stunned and revives during carriage of small game.

Yet another object of the invention herein disclosed and claimed is direct that part of the body of small game which remains outside of the head-restraining enclosure away from the body of the hunter, so as to reduce the prospect of and/or amount of blood or other fluids, which may leak from the body of the small game, getting onto the clothing or body of the hunter during carriage of small game.

4. SUMMARY OF THE INVENTION

The small game carrier disclosed and claimed herein is generally comprised of an elongated tube having an elongated slot, running parallel to the longitude of the elongated tube, extending through the wall of the tube. The inner diameter of the tube is large enough to accommodate size of the head of the game to be taken when the neck of the game is disposed in the elongated slot extending through the wall of the tube. The width of the elongated slot is large wide enough to accommodate the neck of the animals to be taken, but too small for the head of the animals to pass radially through the slot. The length of the slot is long enough to accommodate a vertical stack of a desired number of animals therein but has a terminus at the bottom of the slot to prevent the necks of the harvest animals from sliding out of the bottom of the slot. Means is provided for the hunter to removably attach the elongated tube to an item of the hunter's clothing. One or more reinforcing rings may be provided to reduce tendency of the slot to open and prevent the tube from splitting.

5. BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

6. DESCRIPTION OF THE PREFERRED EMBODIMENT OF THE INVENTION

While the present invention will be described with reference to preferred embodiments, it will be understood by those who are skilled in the art that various changes may be made and equivalents may be substituted for elements thereof without departing from the scope of the invention. In addition, many modifications may be made to adapt a particular situation or material to the teachings of the invention without departing from the essential scope thereof. It is therefore intended that the present invention not be limited to the particular embodiments disclosed as the best mode contemplated for carrying out this invention, but that the invention will include all embodiments and legal equivalents thereof.

Figure 1:
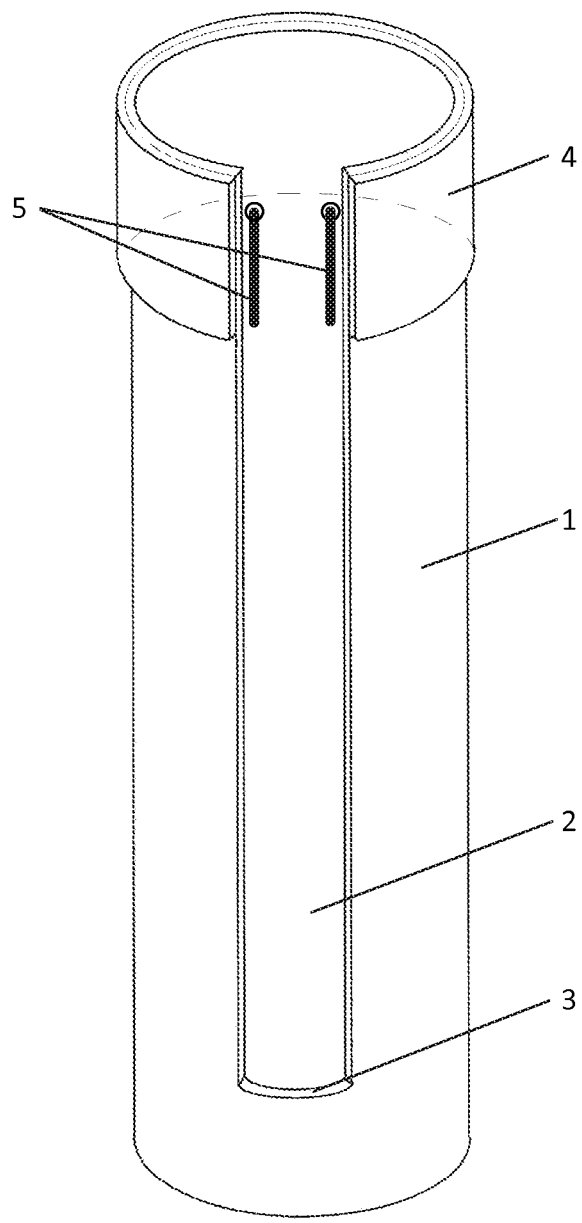
FIG. 1 is a isometric view of the invention from its frontal, slotted side.
Figure 2:
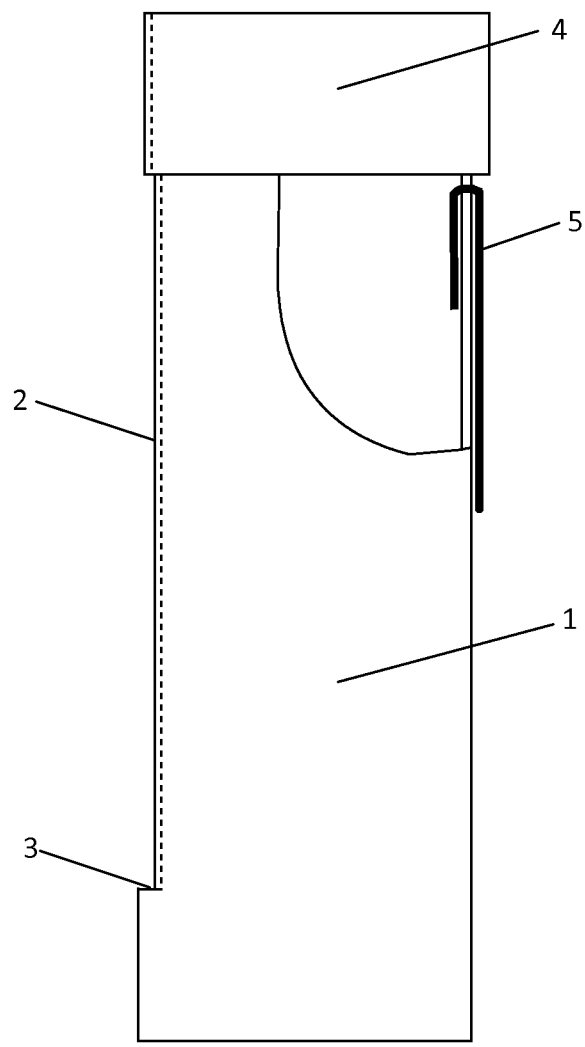
FIG. 2 is partial cut-away (to better show belt clip of the invention) view from the side of the invention (rotated ninety degrees from FIG. 1); and, FIG. 3 is an elevation view of a back of the invention (rotated one-hundred and eighty degrees from FIG. 1).
Figure 3:
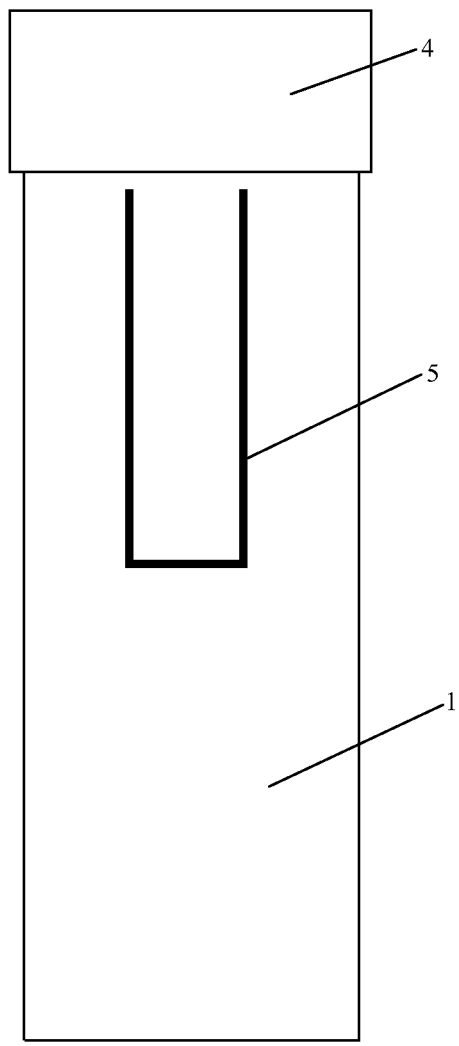

Referring to FIGS. 1, 2 and 3 the main body of the small game carrier is an elongated tube, 1. Elongated tube, 1, will inherently have an upper end, a lower end, an inner diameter, an outer diameter and a wall thickness therebetween. In preferred embodiment elongated tube, 1, will be of circular cross-section, as is shown in the figures, but the invention disclosed and claimed herein is expressly intended to embrace tubes of other cross-sectional shapes, including oval shaped tubes, tubes having one or more flattened sides or other polygonal shapes having one or more flat or curves surfaces.

The material for elongated tube, 1, may be made of any number of materials which are light, strong, durable, resistant to splitting, resistant to corrosion or other adverse changes when exposed to water, blood and bodily fluids of animals, is easy to clean and, other than cleaning, requires little maintenance. Various thermoplastic polymers, such as polyvinyl chloride ("PVC"), of a grade commonly used for water piping, has been found to work well for elongated tube, 1, of the invention. In preference PVC tubing having a wall thickness from about one-eighth of an inch to three-eights of an inch have been found sufficient to produce a tube which has sufficient rigidity but is not uncomfortably heavy to carry when attached to the belt or pants of a hunter or other person to carry small game which have been harvested.

Referring principally to FIG. 1, it is next seen that elongated tube, 1, will in the invention herein disclosed and claimed, have an elongated slot, 2, extending through wall of elongated tube, 1. Elongated slot, 2, will have a length running parallel to the longitude of elongated tube, 1, and a width running transverse to the length of said slot. The width of elongated slot, 2, will be determined by the size of the head and the size of neck of small game to be carried by the small game carrier of the invention herein disclosed and claimed. Namely the width of elongated slot, 2, should be of a dimension which is large enough to easily (without undue tightness) accommodate the neck of small game to be carried by the invention but is too small for the head (namely the skull and jaws) of the small game to be able to pass radially through elongated slot, 2.

The length of elongated slot, 2, is determined by the type and number of small game to be carried by the small game carrier. The small game carrier is designed to be used by placing the head of small game harvested into the top of the inner diameter of elongated tube, 1, sliding the neck of small game through the upper end of elongated slot, 2, letting the body of the small game hang externally from elongated tube, 1. Depending on the size of the head and the neck of small game harvested and the length of elongated slot, 2, a desired number small animals harvested can be carried, heads stacked one on top of another in elongated tube, 1, with necks stacked one on top of another in elongated slot, 2, by the small game carrier of the invention herein disclosed and claimed.

It should be noted that the bottom of elongated slot, 2, is provided with a terminus, 3, as shown in FIG. 1. The purpose of terminus, 3, is two-fold. First elongated slot, 2, is provided with terminus, 3, in order to prevent the necks of small game disposed in elongated slot, 2, from sliding longitudinally out the bottom of elongated slot, 2. Second elongated slot, 2, is provided with terminus, 3, in order to provide for structural integrity of elongated tube, 1, near the bottom of elongated tube, 1, thereby providing resistance to elongated slot, 2, spreading open, perhaps allowing the head of animals to pass radially through elongated slot, 2, perhaps inducing splitting of elongated tube, 1, elsewhere. In FIG. 1 terminus, 3, is shown as a straight edge running transverse to the longitude of elongated slot, 2. However, terminus, 3, need not necessarily be a straight edge running transverse to longitude of elongated slot, 2, and forming an angular corner with the sides of elongated slot, 2, but may form a rounded corners with the sides of elongated slot, 2, so as to avoid creating a stress line which may induce splitting of the wall of elongated tube, 1, along said stress line.

Those skilled in the art will recognize that terminus, 3, may be created in a variety of ways. One may start with a tube which is uncut and cut elongated slot, 2, only a desired length, creating terminus, 3, by simply leaving a portion of elongated tube, 1, uncut. Or, one might start with a tube, cut a slot the entire length of the tube, and use a collar or other ring shape device, disposed internally or externally of elongated tube, 1, to create terminus, 3. Those skilled in the art will also recognize that elongated tube, 1, elongated slot, 2, and terminus, 3, may be created by injection molding or other type of casting, forming techniques. The invention herein disclosed and claims is intended to embrace all such techniques as are known to those skilled in the art for forming a generally tubular structure having a longitudinally dispose slot which said slot has a terminus before the end of the tubular structure.

In as much as undue spreading of elongated slot, 2, to the extent that spreading may allow the head of animals disposed in inner diameter of elongated tube, 1, to pass radially through elongated slot, 2, in addition to preventing spreading of elongated slot, 2, near the bottom of elongated tube, 1, which Is accomplished either by leaving bottom end of elongated tube, 1, intact or by providing a ring to form terminus, 3, near the bottom of elongated tube, 1, it may also be desirable to reinforce the top of elongated tube, 1, against undue spreading of elongated slot, 2. The preferred means to reinforce the top of elongated tube, 1, from undue spreading of elongated slot, 2, near the top of elongated tube, 1, is by means of increasing the thickness of the wall of elongated tube, 1, at or near the top of said tube. This may be accomplished by reinforcing ring, 4, at or near the top of elongated tube, 1, as is shown in FIG. 1. Use of reinforcing ring, 4, which may be formed integrally with elongated tube, 1, or constitute a separate piece which is added to the top of elongated tube, 1, may be considered to constitute a technique reducing amount of, thus weight and strength of materials utilized to make the invention. It will be understood that same resistance to spreading of elongated slot, 2, might be accomplished by thickening the wall of the entire length of elongated tube, 1, or by using materials more resistant to spreading. Thickening the wall of the entire length of tubing is undesirable in that it would require use of more material to make the small game carrier of the invention and make the invention more heavy than it need be. Using materials more resistant to spreading is undesirable in that such materials tend to be more expensive, and even if materials more resistant to spreading the amount of such materials used to make the invention, thus the weight of the invention further reduced, by using a tube that is thinner and using a reinforcing ring, such as illustrated by numeral 4, to reinforce the top of elongated slot, 2, against undue spreading near the top thereof.

Means is also provided to facilitate removable attachment of the small game carrier of the invention to an item of clothing of the user, thereby allowing the user of the invention to use his or her hands for purposes other than carrying the small game carrier of the invention, including but not limited to, loading and shooting of a bows, guns or other weapons, removing game from traps and the like. In preferred embodiment of the invention, such means is provided by belt clip, 5 (partially show in each of FIGS. 1, 2 and 3). In preferred embodiment belt clip, 5, is formed of a wire made of spring steel. Those skilled in the art will know that a belt clip could be formed of many other materials, take many other forms, all of which are intended to be embraced by the scope of the invention herein disclosed and claimed. Those skilled in the art will also recognize that many other means may be used to removable attach a relatively small tubular structure to an item of clothing worn by a user of the invention. The invention may be carried by straps, cords or ropes passing through holes or slot shaped opening in elongated tube, 1, passing through loops or eyes attached to elongated tube, 1, by snaps, buttons and other fastening means designed to removably mate with some other form of fastener attached to or forming part of elongated tube, 1. All such means are intended to be embraced by the invention herein disclosed and claimed.

The invention may be used with either caps, plugs, lid or similar closure, not shown, disposed at either end of elongated tube, 1. Such type of closure may be used at the lower end of elongated tube, 1, in order to help prevent blood or other fluids which may leak from the heads of game disposed inside of elongated tube, 1, from draining onto the clothing or body of a person using the invention. If such closure is used at the bottom of elongated tube, 1, in preferred embodiment of the invention it will be removably attached, so as to facilitate cleaning of the small game carrier, but permanent attachment is also intended to be comprehended within the scope of the invention herein disclosed and claimed. If such a closure is used at top of tube it should also be removably disposed, so that head of small game can be inserted into the inner diameter of elongated tube, 1. However those skilled in the art will recognize that the upper end of elongated tube, 1, could be permanently sealed and an opening or window large enough to insert the head of small game into the inside of elongated tube, 1, created adjacent to elongated slot, 2. Such permutation is also intended to be encompassed within the scope of the invention herein disclosed and claimed.

The invention is simple and easy to use. Elongated tube, 1, is removably attached to an item of clothing worn by the user of the invention. As small game animals are harvested, their necks a slid into the top of elongated slot, 2, with the heads of the small game being disposed inside of elongated tube, 1, the bodies of the small game disposed external of elongated tube, 1. If additional small game is taken their necks are simply slid down elongated slot, 2, onto the top of necks of small game already disposed in elongated slot, 2, until elongated slot, 2, is filled or no further game may be taken. It should be noted that during carriage of small game taken the head of the animals taken is restrained inside of elongated tube, 1, therefore if an animal has been merely stunned and revives, it cannot bite the persons utilizing the invention. It should also be noted that during carriage the bodies of the animals are directed away from the body of the wearer, advantageously reducing the possibility and/or amount of blood and/or other fluids which may leak from the bodies of the taken game from draining onto the clothing of the person wearing the invention and reducing the possibility that a revived animal my claw or scratcher the person wearing the invention.

Removing small game from the invention is simple and easy. The necks of the animals are slid out of the top of elongated slot, 2. In preference the animals will be grasped right behind the necks to remove them to reduce the possibility of being bitten by an animal still alive. The invention is simple and easy to clean by spraying with water, with the aid of detergent, soap or similar solvent, brushing or scrubbing as may be necessary. Provided suitable as suitable material is used, the small game carrier can be soaked in water or other solvents to loosen blood or other fluids which may have dried on the small game carrier disclosed and claimed herein.

Because many varying and different embodiments may be made within the scope of the inventive concept herein taught, and because many modifications may be made in the embodiments herein detailed in accordance with the descriptive requirement of the law, it is to be understood that the details disclosed herein are to be understood as illustrative and not in any limiting sense.

What is claimed is:
1. A small game carrier consisting essentially of:
   a. an elongated tube comprising a reinforced top and a main body portion; and
   b. a clip attached directly to the elongated tube;
   c. wherein the elongated tube has a tube inner diameter;
   d. wherein the tube inner diameter is uniform along the length of the elongated tube through both the reinforced top and the main body portion;
   e. wherein the elongated tube has a smooth tube interior along the length of the elongated tube through both the reinforced top and the main body portion;
   f. wherein the reinforced top has a reinforced top external diameter, the main body portion has a main body portion external diameter and the reinforced top external diameter is greater than the main body portion external diameter;
   g. wherein the elongated tube has an elongated slot having a slot width and a slot length;
   h. wherein the slot length is substantially as long as the small game carrier less a length of a terminus located at an end of the elongated slot;
   i. wherein the length of the terminus is less than the tube inner diameter;
   j. wherein the elongated tube is an unbroken cylinder at a bottom segment of the main body portion and the bottom segment of the main body portion encompasses the terminus;
   k. wherein the bottom segment of the main body portion is rigid;
   l. wherein the slot width is sized to accommodate a neck of a first small game animal; and
   m. wherein the slot width is sized to prevent passage of a head of the first small game animal through the elongated slot.

2. The small game carrier of claim 1 wherein the tube inner diameter of the elongated tube is sized to accommodate the head of the first small game animal.

3. The small game carrier of claim 1 wherein the elongated slot is arranged parallel to a longitude of the elongated tube and the elongated slot extends through a wall of the elongated tube.

4. The small game carrier of claim 1 wherein the slot length is greater than twice the tube inner diameter.

5. The small game carrier of claim 1 wherein the slot width is less than half of the tube inner diameter.

6. The small game carrier of claim 1 wherein the elongated tube has a tube length and the tube length is greater than three times the tube inner diameter.

7. The small game carrier of claim 1 wherein the elongated tube is constructed of a polymer.

8. The small game carrier of claim 1 wherein the elongated tube and the elongated slot are arranged and configured to securely retain a squirrel head within the elongated tube.

9. The small game carrier of claim 1 wherein the elongated tube and the elongated slot are arranged and configured to securely retain a bird head within the elongated tube.

10. The small game carrier of claim 1:
   a. wherein the elongated tube has a tube length;
   b. wherein the terminus has a terminus length that is a portion of the tube length; and
   c. wherein the slot length is greater than five times the terminus length.

11. The small game carrier of claim 1:
   a. wherein the tube inner diameter of the elongated tube is sized to accommodate the head of the first small game animal;
   b. wherein the elongated slot is arranged parallel to a longitude of the elongated tube and the elongated slot extends through a wall of the elongated tube;
   c. wherein the slot length is greater than twice the tube inner diameter;
   d. wherein the slot width is less than half of the tube inner diameter;
   e. wherein the elongated tube has a tube length and the tube length is greater than three times the tube inner diameter;
   f. wherein the elongated tube is constructed of a polymer;
   g. wherein the elongated tube and the elongated slot are arranged and configured to securely retain a squirrel head within the elongated tube;
   h. wherein the terminus has a terminus length that is a portion of the tube length; and
   i. wherein the slot length is greater than five times the terminus length.

12. The small game carrier of claim 1:
   a. wherein the reinforced top external diameter is uniform;
   b. wherein an outside surface the reinforced top is smooth;
   c. wherein the main body portion external diameter is uniform;
   d. wherein an outside surface of the main body portion is smooth; and
   e. wherein the main body portion has a uniform thickness.

13. A method of collecting game comprising:
   a. clipping a small game carrier to an article of clothing of a hunter such that the small game carrier is oriented vertically and such that the small game carrier is adjacent to the hunter;
   b. wherein the small game carrier consists essentially of:
      i. an elongated tube comprising a reinforced top and a main body portion, and
      ii. a clip attached directly to the elongated tube,
      iii. wherein the elongated tube has a tube inner diameter,
      iv. wherein the tube inner diameter is uniform along the length of the elongated tube through both the reinforced top and the main body portion,
      v. wherein the elongated tube has a smooth tube interior along the length of the elongated tube through both the reinforced top and the main body portion,
      vi. wherein the reinforced top has a reinforced top external diameter, the main body portion has a main body portion external diameter and the reinforced top external diameter is greater than the main body portion external diameter,
      vii. wherein the elongated tube has an elongated slot having a slot width and a slot length,
      viii. wherein the slot length is substantially as long as the small game carrier less a length of a terminus located at an end of the elongated slot,
      ix. wherein the length of the terminus is less than the tube inner diameter,
      x. wherein the elongated tube is an unbroken cylinder at a bottom segment of the main body portion and the bottom segment of the main body portion encompasses the terminus,
      xi. wherein the bottom segment of the main body portion is rigid,
      xii. wherein the slot width is sized to accommodate a neck of a first small game animal, and
      xiii. wherein the slot width is sized to prevent passage of a head of the first small game animal through the elongated slot; and
   c. arranging a plurality of small game animals including the first small game animal in a vertically stacked array such that a plurality of heads of the plurality of small game animals are enclosed within the elongated tube.

14. The method of collecting game of claim 13 wherein the arranging of the plurality of small game animals is such that a plurality of bodies of the plurality of small game animals is oriented away from the hunter.

15. The method of collecting game of claim 13
   a. wherein the reinforced top external diameter is uniform;
   b. wherein an outside surface the reinforced top is smooth;
   c. wherein the main body portion external diameter is uniform; and
   d. wherein an outside surface of the main body portion is smooth.

* * * * *